(12) United States Patent
Jung et al.

(10) Patent No.: US 9,338,002 B2
(45) Date of Patent: May 10, 2016

(54) METHOD AND APPARATUS FOR WIRELESS COMMUNICATION USING AN ACOUSTIC SIGNAL

(71) Applicant: Samsung Electronics Co., Ltd., Gyeonggi-do (KR)

(72) Inventors: Hee-Won Jung, Gyeonggi-do (KR);
Seung-Gun Park, Gyeonggi-do (KR);
Jun-Ho Ko, Gyeonggi-do (KR);
Sang-Mook Lee, Gyeonggi-do (KR);
Gi-Sang Lee, Gyeonggi-do (KR);
Sergey Zhidkov, Izhevsk (RU)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/469,417

(22) Filed: Aug. 26, 2014

(65) Prior Publication Data
US 2014/0362993 A1      Dec. 11, 2014

Related U.S. Application Data

(63) Continuation of application No. 12/603,955, filed on Oct. 22, 2009, now Pat. No. 8,818,273.

(30) Foreign Application Priority Data

Oct. 31, 2008 (RU) .............................. 2008143357
Oct. 16, 2009 (KR) ...................... 10-2009-0098900

(51) Int. Cl.
*H04B 7/00* (2006.01)
*H04L 9/08* (2006.01)
(Continued)

(52) U.S. Cl.
CPC ................ *H04L 9/0861* (2013.01); *H04B 1/02* (2013.01); *H04B 11/00* (2013.01); *H04W 12/04* (2013.01); *H04L 2209/24* (2013.01)

(58) Field of Classification Search
CPC ..... H04L 9/08; H04L 9/0861; H04L 2209/24; H04B 1/02
USPC ............. 380/270; 455/41.2, 41.1, 410, 552.1, 455/509
See application file for complete search history.

(56) References Cited

U.S. PATENT DOCUMENTS

6,141,551 A    10/2000  Guruparan et al.
6,236,889 B1    5/2001  Soykan et al.
(Continued)

FOREIGN PATENT DOCUMENTS

CN    101291485    10/2008
EP    1 274 194    1/2003
(Continued)

OTHER PUBLICATIONS

NTT DoCoMo, Technical Journal, Technology Reports, vol. 14, No. 2, Online, Dec. 17, 2014.
(Continued)

*Primary Examiner* — Marceau Milord
(74) *Attorney, Agent, or Firm* — The Farrell Law Firm, P.C.

(57) ABSTRACT

Systems, apparatuses, and methods for securing wireless communication using an acoustic signal are described. In one method involving a first and second device, the second device generates, when connecting to the first device, connection initiation information including key information for secure communication, converts the connection initiation information to an acoustic signal, and transmits the acoustic signal to the first device through an acoustic communication channel. Then the second device monitors a radio wireless channel, which is secured using the key information for secure communication, to determine whether a valid response is received from the first device and, upon receipt of the valid response, discontinues transmission of the acoustic signal and begins communicating with the first device securely on the radio wireless channel.

5 Claims, 7 Drawing Sheets

(51) Int. Cl.
*H04B 11/00* (2006.01)
*H04W 12/04* (2009.01)
*H04B 1/02* (2006.01)

(56) References Cited

U.S. PATENT DOCUMENTS

| | | | |
|---|---|---|---|
| 6,392,960 B1* | 5/2002 | Seltzer | H04B 11/00 367/134 |
| 6,747,916 B1 | 6/2004 | Fleury et al. | |
| 6,934,521 B1 | 8/2005 | Fleury et al. | |
| 6,947,893 B1* | 9/2005 | Iwaki | G01C 21/3629 701/441 |
| 6,981,157 B2* | 12/2005 | Jakobsson | H04L 63/067 713/165 |
| 6,983,009 B2* | 1/2006 | Lomp | H04B 1/707 370/342 |
| 7,860,149 B2* | 12/2010 | Palanki | H04B 1/7143 375/132 |
| 7,912,222 B2* | 3/2011 | Hagiwara | H04L 9/32 380/247 |
| 7,941,665 B2 | 5/2011 | Berkema et al. | |
| 8,126,398 B2* | 2/2012 | Torrance | G08C 17/00 455/41.2 |
| 8,494,176 B2 | 7/2013 | Suzuki et al. | |
| 8,693,520 B2* | 4/2014 | Kim | H04B 1/7143 370/329 |
| 8,798,183 B2* | 8/2014 | Xu | H04B 7/0617 375/219 |
| 8,818,273 B2* | 8/2014 | Jung | H04B 11/00 455/41.2 |
| 2002/0051482 A1 | 5/2002 | Lomp | |
| 2002/0152314 A1 | 10/2002 | Hayek et al. | |
| 2003/0095676 A1 | 5/2003 | Shen et al. | |
| 2003/0181164 A1 | 9/2003 | Kutaragi et al. | |
| 2004/0213587 A1 | 10/2004 | Conchas et al. | |
| 2005/0239491 A1 | 10/2005 | Feder et al. | |
| 2005/0254344 A1 | 11/2005 | Barras | |
| 2005/0276418 A1 | 12/2005 | Hagiwara | |
| 2006/0009977 A1* | 1/2006 | Kato | G10L 13/10 704/260 |
| 2006/0020467 A1* | 1/2006 | Iwaki | G01C 21/3629 704/258 |
| 2006/0153390 A1 | 7/2006 | Iwaki et al. | |
| 2007/0037517 A1 | 2/2007 | Camuffo et al. | |
| 2007/0171053 A1 | 7/2007 | Heppeler | |
| 2008/0113619 A1 | 5/2008 | Torrance et al. | |
| 2008/0113621 A1 | 5/2008 | Parthasarathy | |
| 2008/0243491 A1 | 10/2008 | Matsuoka | |
| 2008/0261646 A1* | 10/2008 | Juang | H04W 52/0229 455/550.1 |
| 2009/0067292 A1 | 3/2009 | Matsuoka | |
| 2014/0154969 A1 | 6/2014 | Atsmon et al. | |

FOREIGN PATENT DOCUMENTS

| | | |
|---|---|---|
| JP | 2000-295658 | 10/2000 |
| JP | 2001-100772 | 4/2001 |
| JP | 2001-119492 | 4/2001 |
| JP | 2001-148670 | 5/2001 |
| JP | 2002-527926 | 8/2002 |
| JP | 2004-363670 | 12/2004 |
| JP | 2005-174327 | 6/2005 |
| JP | 2005-333606 | 12/2005 |
| JP | 2006-018593 | 1/2006 |
| JP | 3822224 | 9/2006 |
| JP | 2007-228175 | 9/2007 |
| JP | 2008-005541 | 1/2008 |
| RU | 2 199 183 | 2/2003 |
| RU | 2 364 042 | 1/2006 |
| WO | WO 01/93614 | 12/2001 |

OTHER PUBLICATIONS

Japanese Office Action dated Jan. 6, 2015 issued in counterpart application No. 2014-085563.
Kim Zetter, "Security Cavities Ail Bluetooth," Aug. 6, 2004.
Anindya Bakshi, "Bluetooth Secure Simple Pairing," Dec. 2007.
ECMA International, "Near Field Communication Interface and Protocol (NFCIP-1)," Standard ECMA-340, 2nd Edition, Dec. 2004.
ECMA international, "Near Field Communication Interface and Protocol (NFCIP-2)," Standard ECMA-352, 2nd Edition, Jun. 2010.
V. Gerasimov et al., "Things That Talk: Using Sound for Device-to-Device and Device-to-Human Communication," Aug. 2006.

* cited by examiner

METHOD AND APPARATUS FOR WIRELESS COMMUNICATION USING AN ACOUSTIC SIGNAL

PRIORITY

This application is a continuation of, and claims priority under 35 U.S.C. §120 to, U.S. application Ser. No. 12/603,955, filed on Oct. 22, 2009 and issuing on August 26 as U.S. Pat. No. 8,818,273, which claimed priority under 35 U.S.C. §119(a) to a Russian Patent Application filed in the Russian Patent and Trademark Office on Oct. 31, 2008 and assigned Serial No. 2008143357, and to a Korean Patent Application filed in the Korean Intellectual Property Office on Oct. 16, 2009 and assigned Serial No. 10-2009-0098900, the disclosures of all of which are incorporated herein by reference.

BACKGROUND OF THE INVENTION

1. Field of the Invention

The present invention generally relates generally to a wireless communication technology suitable for establishing a communication link between wireless devices, and more particularly, to a method and apparatus for wireless communication using an acoustic signal.

2. Description of the Related Art

Wireless auxiliary devices, such as telephone headset assemblies, earphones, etc., communicate with their respective base devices (e.g., a telephone, a communication terminal, a mobile PC, a player, etc.) via a radio channel in a digital transmission scheme designed for transmission of voice and music programs.

The use of a radio channel for transmission in a digital format leads to a larger effective range (10 ms or greater) and ensures transmission confidentiality when using a specific encryption technique. For wireless earphones and telephone headset assemblies, standardized systems of digital radio communication, such as Bluetooth or Wireless-Fidelity (Wi-Fi), are commonly used through a wireless link. Despite their advantages, the devices using this transmission technique still have some substantial drawbacks.

For example, for an initial establishment of a secure link between two devices, i.e., a link that is protected against unauthorized access and eavesdropping, the two devices need to identify each other and exchange cryptographic keys. Unfortunately, because the radio channel radiates a decent distance from the paired devices and can be easily monitored by a malicious party, it is not suitable for such a type of data transmission.

In the existing models of Bluetooth wireless telephone headsets, a Personal Identification Number (PIN) code-based method is used to connect devices. More specifically, a PIN code (i.e., a combination of digits and symbols) is stored in a memory of the auxiliary device and at the same time, it is printed in paper or written in an electronic format document for a given device.

A method for establishing a wireless communication link between the auxiliary device and the base device is schematically illustrated in FIG. 1 and performed in the following procedure.

(1) Wireless transceivers of the both devices are turned on and the base device searches for available auxiliary devices, e.g., Bluetooth type devices, such as a hands-free headset.

(2) The base device identifies its "own" auxiliary device by name in a list of the auxiliary devices detected by the base device.

(3) The PIN code of the auxiliary device is then input to the base device through a keyboard.

(4) Subsequently, the connected devices carry out an authentication procedure by applying a shared, private PIN code and exchange encrypted data through a radio channel (e.g., various authentication and encryption algorithms may be available).

(5) If both the devices use the same PIN code, the authentication and encryption procedures are successful and a communication channel is established (i.e., data exchange between the devices is permitted). Otherwise, the communication channel setup is not established.

In the above-described procedure, a user performs operations (1)-(3). However, the shared, private PIN code cannot be transmitted through the radio channel because a radio signal from the device (e.g., a Bluetooth signal) may be intercepted by a malicious party, even over a considerable distance. For example, even though class-2 apparatuses have a nominal effective range of only 10 m, tests have shown that with a high-quality receiver and a class-2 beamed antenna, the signal may be received error-free at a distance of up to 1.8 km.

Accordingly, the user should personally enter the PIN code and should ensure confidentiality of this information.

Unfortunately, the foregoing approach also has a number of drawbacks in terms of security and usability.

First, the PIN code information must always be available to the user when pairing devices, which is not always possible, because the PIN code documentation may be lost or unavailable at the moment.

Secondly, the PIN code should be long enough for reliable protection of the devices against unauthorized access. However, the keyboard is usually emulated on a display in the devices, which may be inconvenient for entering the long PIN code. Consequently, the probability of error occurrence is increased during the manual entry of a long PIN code, and it more likely that a long PIN code will be forgotten by the user.

To overcome these drawbacks, manufacturers of telephone headsets and other similar auxiliary devices have simplified the pairing procedure, using a shorter and/or easier PIN code to remember, for example, "0000". However, these shorter PIN codes are more susceptible to potential attacks from a malicious party (e.g., parallel connection of other devices to the base device and its monitoring).

Moreover, even if the manufacturers use a longer PIN code, the system may still be in danger of unauthorized access, if the PIN code is fixed. For example, if an intruder somehow manages to find out the PIN code (e.g., to oversee the documentation, to peep entry on the display, etc.), then in the future the intruder will be able to use this information any time to establish an unauthorized connection with the device (e.g., the intruder can use an automobile hands-free kit as an eavesdropping device).

A more secure and simple method for establishing a wireless communication link is known (i.e., a new specification of Bluetooth version 2.1,). By using this newer encryption method with a public key, the standard developers have managed to achieve enhanced protection of communication with a comparatively short PIN code (i.e., a 6-digit PIN code provides the same protection degree as a 15-unit alphanumeric PIN code defined in the previous standards). However, still, the user must enter the PIN code manually using a keyboard, and when an auxiliary device has no display area and/or data entering device, which is quite common in telephone headset assemblies and earphones, then the PIN code is fixed.

Another drawback with the above-described methods is that prior to beginning the connection, the auxiliary device must be in a "visible" or "detectable" mode for performing operations (1) and (2), i.e., the auxiliary device must respond to requests of another device that attempts to establish a link, which is also potentially dangerous (e.g., a malicious party might, in such a manner, detect a device that is left in a car and then break into the car to steal it).

Another method of the wireless communication link establishment and the wireless communication system uses a key that is transmitted through an additional radio channel. In this case, an additional Near Field Communication (NFC) transceiver and controller should be introduced to the auxiliary device, thus considerably complicating the structure, increasing the mass/volume and cost of the device, and weakening its competitiveness in the market.

Another technique for establishing a wireless communication link and a wireless communication system is disclosed in Russian Patent Application No. RU2005130483, H04L 12/56, SONY ERICKSON MOBILE COMMUNICATIONS AB (SE), which was published Jan. 27, 2006. In this reference, the communication link establishment procedure is initiated between a base device and an auxiliary device in the auxiliary device. Then a communication signal is generated in the auxiliary device and converted to a signal for transmission through an additional communication link based on a mobile cellular network, and transmitted to the turned-on base device by cellular communication. An operation mode is set according to a basic communication link of the auxiliary device. The communication signal is extracted from the received data in the base device. If the received communication signal is identical to a communication signal stored in the base device, a communication link is established between the auxiliary device and the base device in accordance with the basic communication link.

However, in the reference above, both devices are required to connect to the cellular network, although many devices (e.g., an MP3 player, a wireless headset, etc.) do not provide cellular connectivity. Moreover, network operator services are paid services (e.g., Short Message Service (SMS)), which is not economically advantageous for the user. Further, the cellular network may not always be available at all times and locations. Finally, during a heavy network load, the link establishment may take a long time.

SUMMARY OF THE INVENTION

The present invention is designed to address at least the problems and/or disadvantages described above and to provide at least the advantages described below. Accordingly, an aspect of the present invention is to provide a simple and secure method for wireless communication that enhances the security of a wireless communication link between devices, reduces a pairing time, and increases convenience and functionality, without requiring any substantial changes in the mass/volume dimensions and design of a device.

Another aspect of the present invention establishes a wireless communication link between devices using an acoustic communication line for transmitting an acoustic communication signal from an auxiliary device to a base device.

In accordance with an aspect of the present invention, a method for wireless communication using an acoustic signal between a first device and a second device is provided, including the steps of generating, by the second device, when the second device connects the first device, connection initiation information including key information for secure communication; converting the connection initiation information to an acoustic signal; transmitting the acoustic signal to the first device through an acoustic communication channel; monitoring a radio wireless channel, which is secured using the key information for secure communication, to determine whether a valid response from the first device is received; and, upon receipt of the valid response from the first device, discontinuing transmission of the acoustic signal; and communicating with the first device securely on the radio wireless channel.

BRIEF DESCRIPTION OF THE DRAWINGS

The above and other aspects, features, and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE INVENTION

The matters defined in the description below, such as a detailed construction and elements, are provided to assist in a comprehensive understanding of the described embodiments of the present invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
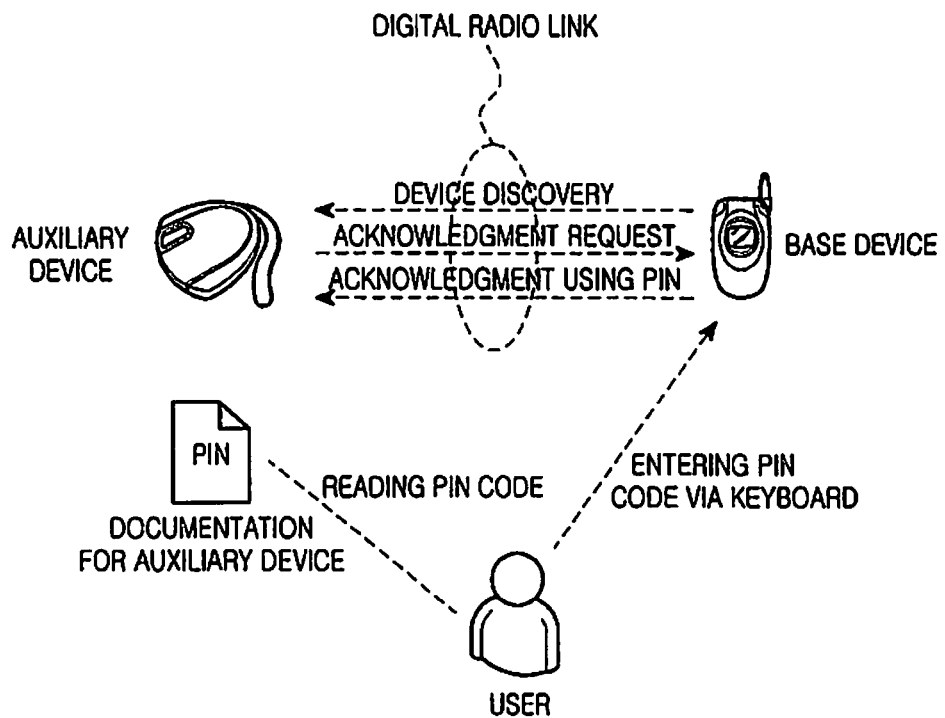
FIG. 1 illustrates a conventional method for establishing a wireless communication link between a base device and an auxiliary device.
Figure 2:
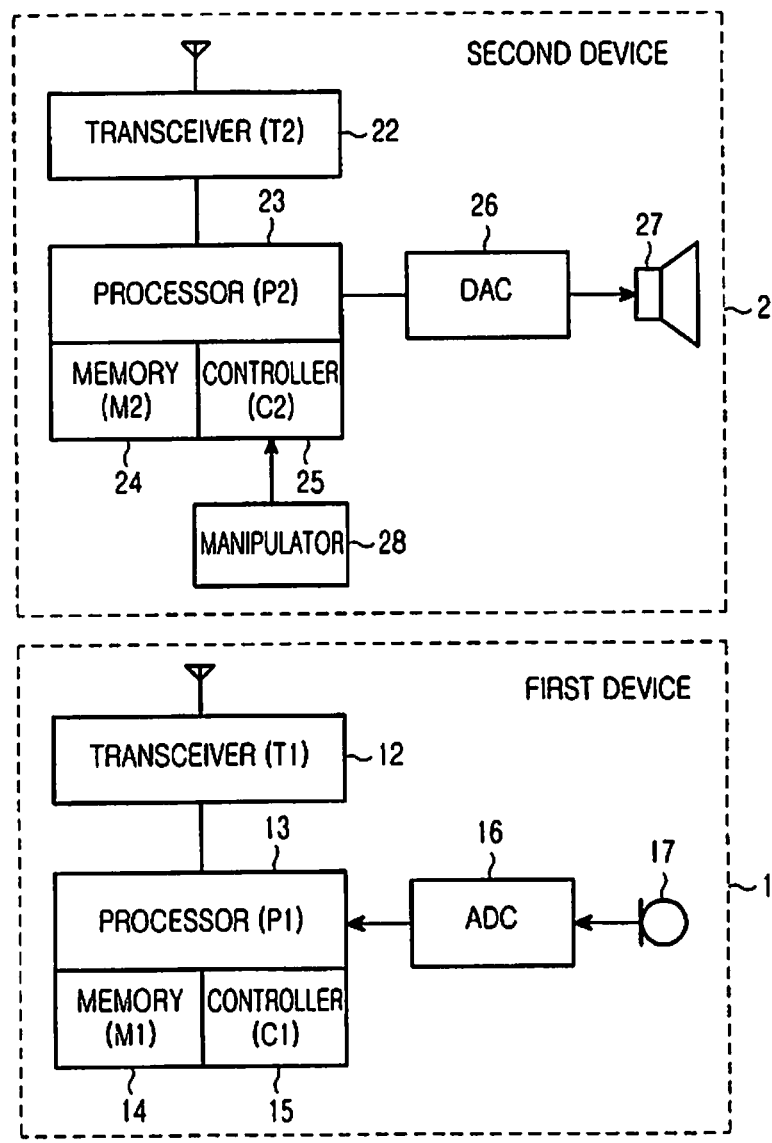
FIG. 2 is a block diagram of a wireless communication system for establishing a wireless communication link using an acoustic signal according to an embodiment of the present invention.

FIG. 2 is a block diagram of a wireless communication system for establishing a wireless communication link using an acoustic signal according to an embodiment of the present invention.

Referring to FIG. 2, the wireless communication system basically includes a first device 1 (e.g. base device) and a second device 2 (e.g. auxiliary device). The first device 1 may be a mobile phone, for example, and the second device 2 may be a wireless telephone headset, for example. The following description will be made in the context of a radio link being a primary communication link between the first device 1 and the second device 2, by way of example. More specifically, FIG. 2 will be described using a Bluetooth digital radio channel, by way of example.

In the first device 1, a transceiver 12 (T1) receives and transmits a signal on a radio channel via an air interface. A processor 13 (P1) interworks with a memory 14 (M1) and a controller 15 (C1). A microphone 17 is connected to the input of the processor 13 through an Analog-to-Digital Converter (ADC) 16.

In the second device 2, a transceiver 22 (T2) receives and transmits a signal on a radio channel via an air interface. A processor 23 (P2) interworks with a memory 24 (M2) and a controller 25 (C2). A loudspeaker 27 (e.g., a receiver inset or a speaker) is connected to the output of the processor 23 through a Digital-to-Analog Converter (DAC) 26. At least one manipulator 28, such as a button or keypad, is installed on an outer surface of the second device 2 and receives a manipulation signal from a user and provides the manipulation signal to the controller 25.

The transceiver 12 of the first device 1 and the transceiver 22 of the second device 2 are intended for establishing a wireless communication link according to the basic type of data transmission, for example, a Bluetooth radio link (a primary communication link).

The processors 13 and 23 of the first and second devices 1 and 2 may have additional inputs and outputs for connection to additional devices such as a manipulator (specifically, a keyboard), a display, a loudspeaker (in the first device 1) or a microphone (in the second device 2), etc.

In accordance with an embodiment of the present invention, additional software is installed in the memory 14 of the processor 13 in the first device 1. The software program includes a program for detecting a specific audible tone, extracting useful information (communication signal) by decoding the detected audible tone, and comparing it with information known to the controller 15 or stored in the memory 14 of the processor 13. Also, the software program includes data program for transmitting a response signal through the transceiver 12 to establish the primary communication link (e.g., a Bluetooth link).

Using the software program, the first device 1 may receive connection information included in an audible tone through the microphone 17, when pairing with another device, by receiving the audible tone and decoding the received tone.

Apart from the usual functions of the second device 2, the processor 23 of the second device 2 may additionally generate a pseudorandom key, prepare an audible tone transmission for transmission through the loudspeaker 27 and detection of an acknowledgement signal through the transceiver 22, and generate commands for setting the second device 2 to reception, transmission, and transmission prohibition modes.

For this purpose, in accordance with an embodiment of the present invention, additional software is installed in the memory 24 of the processor 23 in the second device 2, or in accordance with another embodiment of the present invention additional software is installed on an additional chip connected to the processor 23. At the same time, the memory 24 of the processor 23 (or the additional chip) stores identification information, for example, an expected acknowledgement signal.

Because a pseudorandom key generation and preparation of an audible tone transmission require comparatively small processor resources, the additional functions may be implemented in the second device 2 (even when a low-level microcontroller or digital signal processor is used). Additionally, these functions of the present invention can be realized in any currently produced device.

Accordingly, various embodiments of the present invention may be implemented in certain wireless telephone headsets and earphones by merely updating built-in software (e.g., a firmware update), without having to purchase new devices. In newly designed devices, additional software installation is nearly always possible.

Accordingly, the processors 13 and 23 perform their functions using the basic and additional software installed in each of them through processing, shaping, transmission, and command and data exchange between the components of the processors 13 and 23, as well as with the outside.

Figure 3:
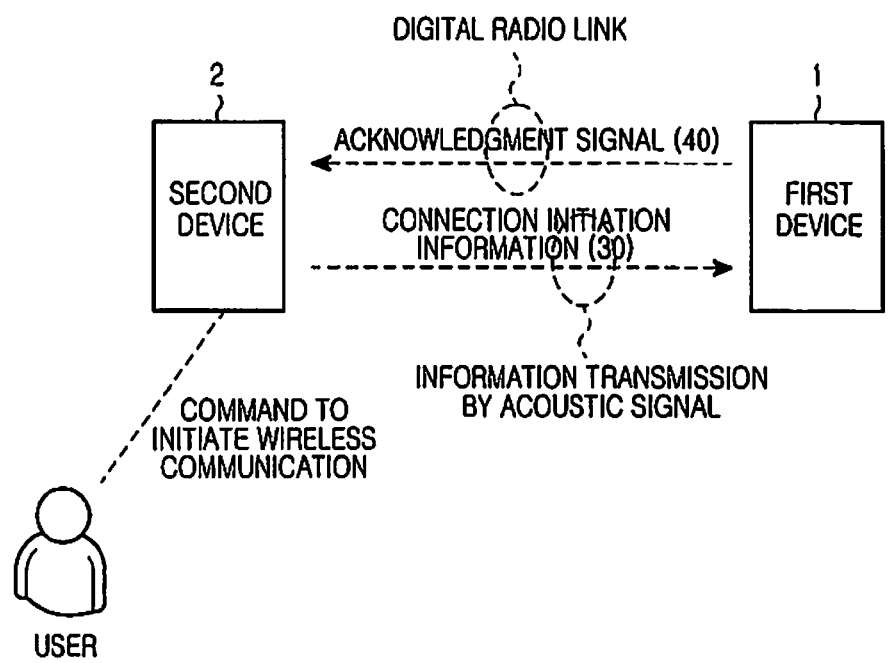
FIG. 3 illustrates a method for wireless communication using an acoustic signal according to an embodiment of the present invention.

FIG. 3 illustrates a method for wireless communication using an acoustic signal according to an embodiment of the present invention.

Referring to FIG. 3, in a wireless communication method between the first device 1 and the second device 2 according to an embodiment of the present invention, upon receipt of a command requesting initiation of wireless communication from the user, the second device 2 transmits communication information for connection initiation to the first device 1 using an acoustic signal in step 30. The connection initiation information includes information about a key for secure communication between the devices 1 and 2 (e.g., a pseudorandom number, such as, a Personal Identification Number (PIN) code).

Upon receipt of the connection initiation information by the acoustic signal through the microphone 17, the first device 1 transmits an acknowledgement signal generated based on the received information to the second device 2 in step 40. The acknowledgment signal is transmitted on a wireless communication channel, for example, via a digital radio link, and thereafter, wireless communication may be conducted between both the devices 1 and 2 via the digital radio link.

If the first device 1 is further provided with a loudspeaker and the second device 2 is further provided with a microphone, wireless communication may also be conducted on an acoustic communication channel by an acoustic signal, as well as the transmission of the acknowledgment signal from the first device 1 to the second device 2. In this case, information is exchanged between the first device 1 and the second device 2 by an acoustic signal in such a manner that a total acoustic signal band is appropriately segmented and different acoustic signal transmission bands are allocated to the first and second devices 1 and 2 to prevent mixing acoustic signals from each device.

Figure 4:
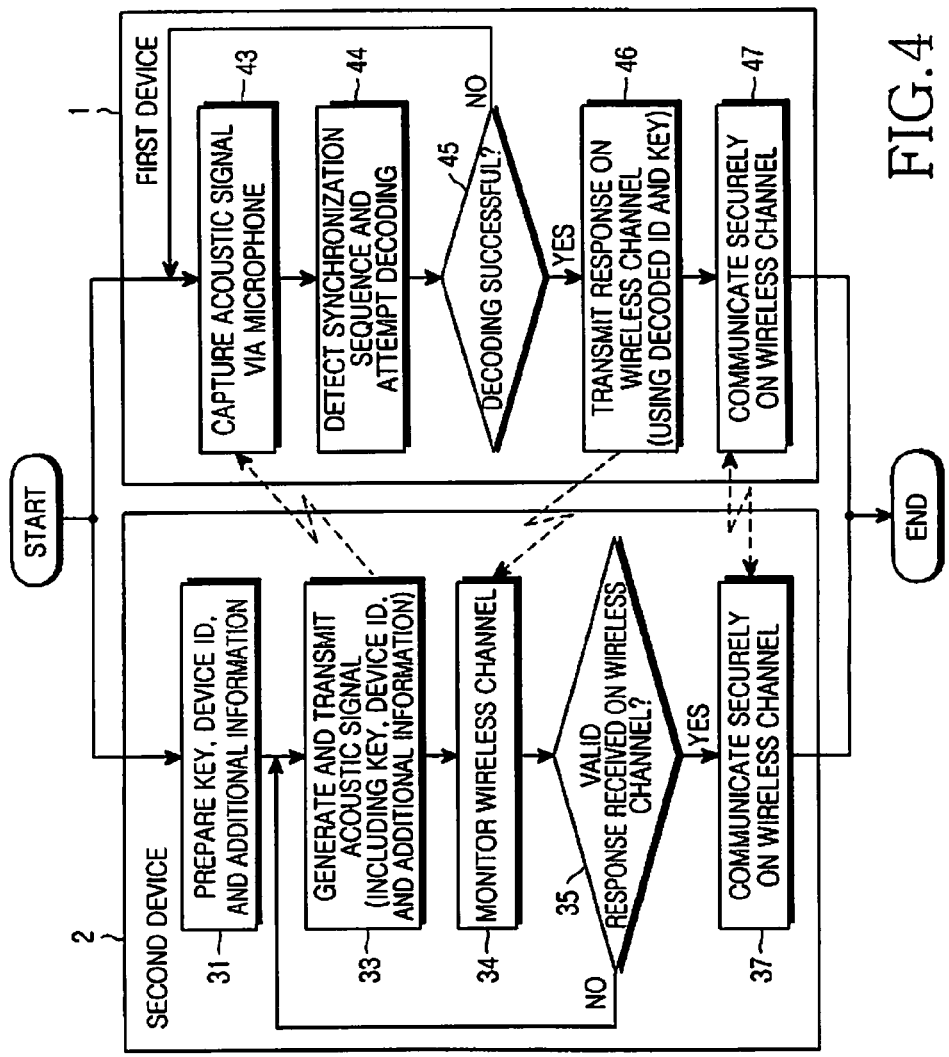
FIG. 4 is a flowchart illustrating an operation for establishing a wireless communication link using an acoustic signal according to an embodiment of the present invention.

FIG. 4 is a detailed flowchart illustrating an operation for establishing a wireless communication link using an acoustic signal according to an embodiment of the present invention.

Referring to FIG. 4, the second device 2 prepares a key, a device Identifier (ID), and other additional information that will be converted to an acoustic signal in step 31. In step 33, the second device 2 generates an acoustic signal including the key, the device ID, and the additional information and then transmits the acoustic signal to device 1. The second device 2 then monitors a wireless channel (for example, a radio channel) to determine whether a valid response signal for the acoustic signal has been received on the wireless channel in step 34. The response signal for the acoustic signal may be transmitted from the first device 1 in step 46, which will be described later in more detail.

Upon receipt of the response signal on the wireless channel, the second device 2 confirms the validity of the response in step 35 and securely communicates with the first device 1 on the wireless channel in step 37, if the response is valid. However, if the second device 2 does not receive a valid response signal, the operation returns to step 33.

The first device 1 captures an acoustic signal (e.g., the acoustic signal transmitted from the second device 2 in step 33) through the microphone 17 in step 43. In step 44, the first device 1 detects a synchronization sequence by analyzing the acoustic signal and attempts to decode the acoustic signal in step 44. The first device 1 determines whether the decoding is successful in step 45. If the decoding is successful, the first device 1 transmits a response signal using the decoded device ID and key on the wireless channel in step 46 and communicates securely with the second device 2 on the wireless channel in step 47. If the decoding is unsuccessful, the first device 1 captures a new signal in step 43.

Figure 5:
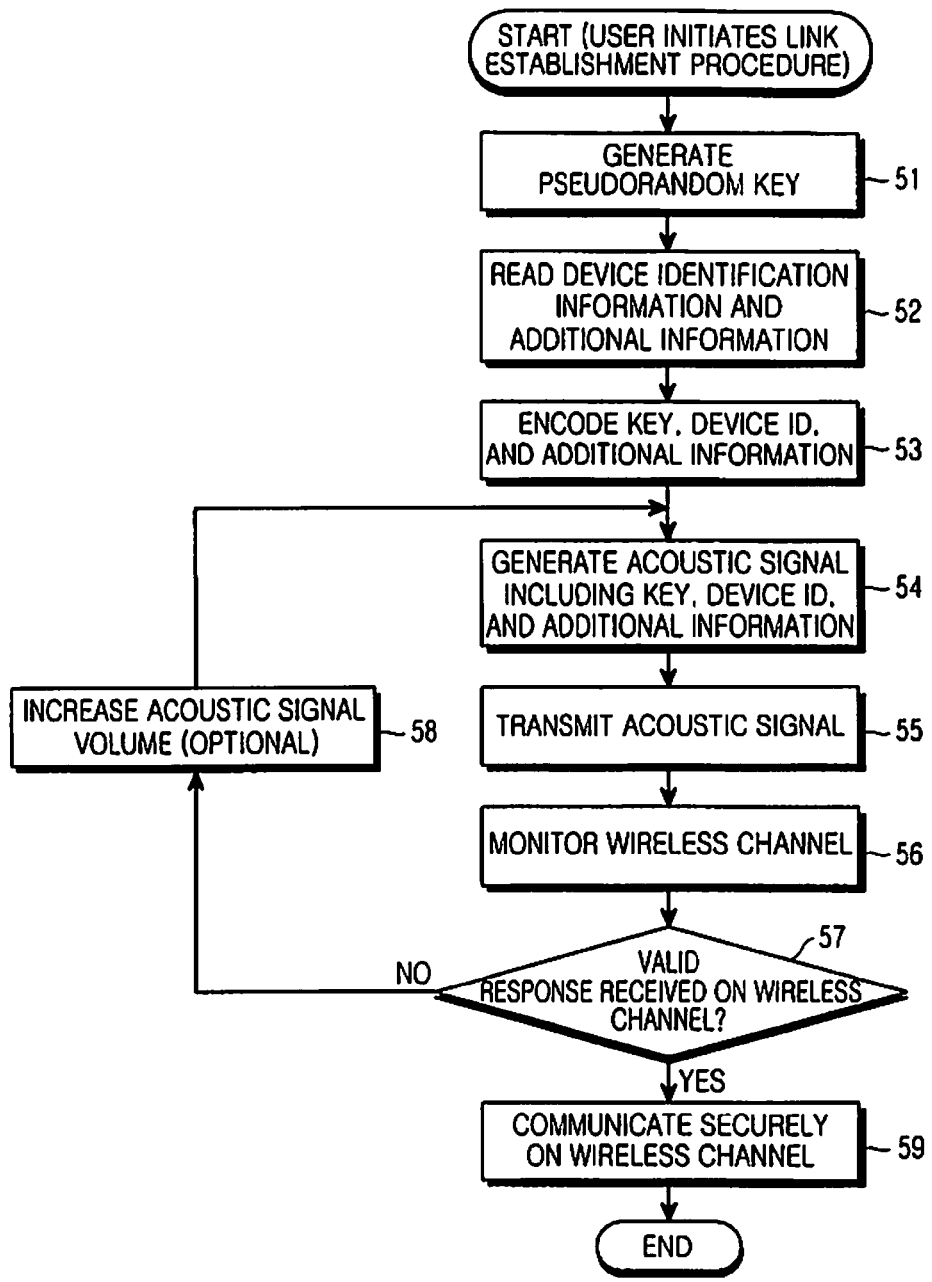
FIG. 5 is a flowchart illustrating an operation for establishing a wireless communication link using an acoustic signal in the auxiliary device according to an embodiment of the present invention.
Figure 6:
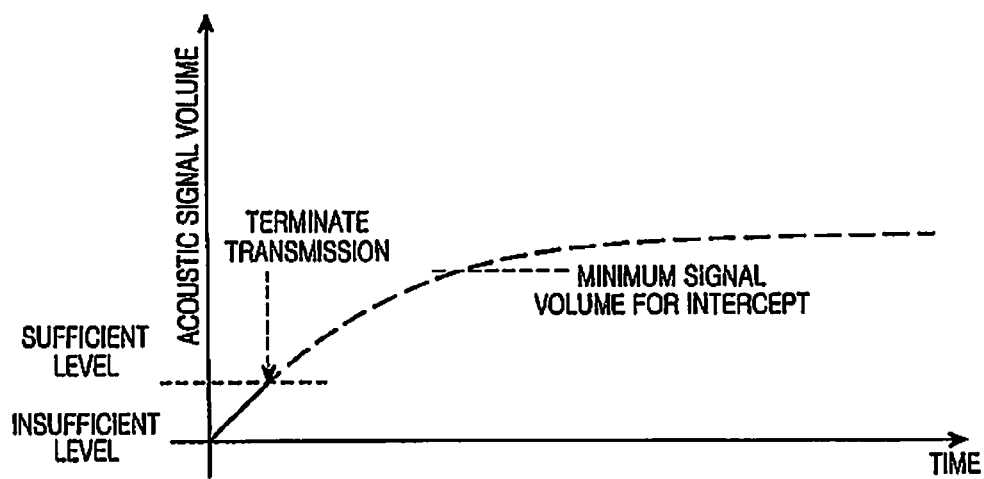
FIG. 6 is a graph illustrating an increase in sound volume during transmission of an acoustic signal in the operation illustrated in FIG. 5.

FIG. 5 is a flowchart illustrating an operation for establishing a wireless communication link using an acoustic signal in the second device according to an embodiment of the present invention and FIG. 6 is a graph illustrating an increase in sound volume during transmission of an acoustic signal in the operation illustrated in FIG. 6.

Referring to FIG. 5, when the first device 1 (e.g., a mobile phone) and the second device 2 (e.g., a telephone headset) are turned on, their power supplies supply power to components requiring power, for operations of the components. At the same time, the transceiver 22 of the second device 2 is placed in an "invisible" mode and does not respond to requests from the devices. For this purpose, the controller 25 of the second device 2 transmits a data transmission blocking command to the transceiver 22. Meanwhile, the transceiver 12 of the first device 1 may be placed in a data reception/transmission mode and the transceiver 22 of the second device 2 may be in a reception mode. Actually, the operation modes of the transceivers 12 and 22 may be set later when needed.

If the second device 2 requests establishment of a communication link with the first device 1, the turned-on second device 2 initiates a wireless communication link establishment procedure by generating a startup signal from the controller 25 according to user input received through at least one manipulator 28 (e.g., a key, a button, etc.), which according to an embodiment of the invention, is the only operation on the part of the user. For example, the user may initiate the process by pressing a predetermined key in the second device 2.

Many variants are possible for the pairing process startup, such as a user pressing a button several times or holding a pressed button for a certain time (e.g., 5 sec.). The device manufacturer may also choose any other combination for the pairing process startup in the second device 2. For example, in accordance with another embodiment of the present invention, the initiation may be carried out immediately after turning on the second device 2 (without any additional operation of the user).

When the startup signal is provided to the controller 25, the processor 23 of the second device 2 generates a pseudorandom key (analogous to a PIN code) in step 51 and adds second device identification information, such as the model and name of the second device 2, and/or additional information (e.g., current time, data, etc.) stored in the memory 24 to the pseudorandom key (e.g., an overlapping the pseudorandom key or adding at the start/end of the pseudorandom key) in step 52. In step 53, the resulting information is encoded and added with a synchronization sequence. The communication signal is converted to an acoustic communication signal (i.e., a signal to be transmitted through a secondary communication link) containing the pseudorandom key and the identification information in step 54. Simultaneously, the controller 23 prepares for transmission of an audible tone for reproduction of the acoustic signal through the loudspeaker 27.

In step 55, the ADC 26 converts the acoustic signal received from the processor 23 to an analog signal and provides the analog signal to the loudspeaker 27. The acoustic signal is transferred through the loudspeaker 27 with a volume controlled directly in the loudspeaker 27 or controlled by a "louder" signal from the controller 25. Simultaneously, the transceiver 22 is placed into the reception mode, according to a command from the controller 25 to the processor 23, if the reception mode was not set before.

Upon receipt of the acoustic signal, the first device 1 may reply with an acknowledgment signal. The second device 2 monitors a wireless channel (e.g., a radio channel) to determine whether a valid response has been received on the wireless channel in step 56. In step 57, the second device 2 determines whether a valid response has been received. If a valid response signal has been received (that is, information included in the acknowledgment signal matches the pseudorandom key and the identification information initially generated from the second device 2), the second device 2 ends the acoustic signal transmission through the loudspeaker 27 and places the transceiver 22 in a transmission mode in which a secure link is established between the first device 1 and the second device 2 through the primary communication channel in step 59. That is, as the acoustic signal transmission is terminated, data exchange is permitted between the first and second devices 1 and 2 through a wireless communication link on the radio channel. Any information transmission is possible from the first device 1 to the second device 2 through the radio channel. Thus, the second device 2 may be in the "invisible" mode immediately after the response reception from the first device 1 about the reception of the acoustic signal.

However, if the second device 2 fails to receive a valid response signal from the first device 1 in step 57, the second device 2 increases the volume of the acoustic signal by a predetermined level in step 58 and the operation returns to step 54. In accordance with an embodiment of the present invention, the volume of the acoustic signal increases gradually, as illustrated in FIG. 6.

If a malicious party is able to intercept or decode an acoustic signal transmitted by a transmitting device (i.e., the second device 2), the security of the radio link may be breached. Therefore, in accordance with an embodiment of the present invention, the acoustic signal should be emitted with as low a volume as possible to improve security. However, the first device 1 and the second device 2 may be located in a noisy environment. Therefore, to ensure link establishment, while still maximizing security, in accordance with an embodiment of the present invention, the sound volume gradually is gradually increased as necessary, as illustrated in FIG. 6.

Initially, the first device 1 may not be able extract information from an acoustic signal with a low sound volume. However, if the signal level of the acoustic signal gets strong enough to be detected, the first device 1 can immediately start to decode data and establish a link. When the second device 2 receives an acknowledgment signal through the radio channel, it discontinues the acoustic signal transmission. As a result, the acoustic signal volume does not exceed a "sufficient level".

Additionally, a malicious party is usually remote and requires a higher-volume acoustic signal to intercept it. Accordingly, the above-described method may prevent a malicious party from intercepting the acoustic signal.

To prevent the interception of the acoustic signal by a malicious party, an allowed maximum volume may be set for the acoustic signal. In addition, a maximum acoustic signal transmission time may be set. For example, when either of the maximum volume or time is exceeded that the link establishment procedure may be terminated.

In accordance with an embodiment of the present invention, each time the second device 2 attempts a new link establishment, it generates a new key so that even if a malicious party is able to intercept a key, that a malicious party cannot use the intercepted key for a repeated link establishment.

For audible tone shaping in real time, a processor capacity in the range of 5 to 15 MIPS (million operations per second) is preferable. The majority of the devices of such type have a built-in 30 MIPS capacity microprocessor and higher for the full-scale implementation of Bluetooth protocols.

Furthermore, if the capacity of a device built-in microprocessor is lower than the required capacity, it is still possible to generate the audible tone, although not on a real time basis. In this case, in accordance with an embodiment of the present invention, the readout of the audible tone is generated by the microcontroller in advance and recorded in the device short-term memory. Thereafter, the recorded signal for transmission is reproduced, e.g., by cyclic repetition. In this implementation, there may be a small pause (1-2 sec.) between the moments when the user has initiated the pairing process and when the audible tone reproduction begins. However, such a pause is nearly imperceptible to an ordinary user.

It is noted that the details of the shaping method and the content of the acoustic communication signal may differ and do not specifically relate to the subject of the present invention directly. Therefore, they are not described more specifically.

In practice, a data transmission distance depends on a level of external acoustic noises, the volume of the audible tone reproduction, and the microphone sensitivity. In many cases, the actual distance may decrease to several centimeters, especially in for low-powered acoustic transducers, used in the headphone and telephone headset assembly. However, this situation is actually advantageous to the present invention, because it significantly complicates the picking up of the key information by a malicious party.

Furthermore, it is presumed that for quick and safe establishment of the communication link, the first device 1 and the second device 2 are positioned within an operating range of the audible tone (i.e., in close proximity)—at the distance of about 2-50 cm. Such positioning is natural for similar devices and convenient for the user. At the indicated distances, the microphone 17 of the first device 1 is capable of detecting the audible tones, radiated by the second device 2 without difficulty. In case of the minimum distance between the devices, it will be practically impossible for the malicious party to "intercept" the pairing (link establishment).

Figure 7:
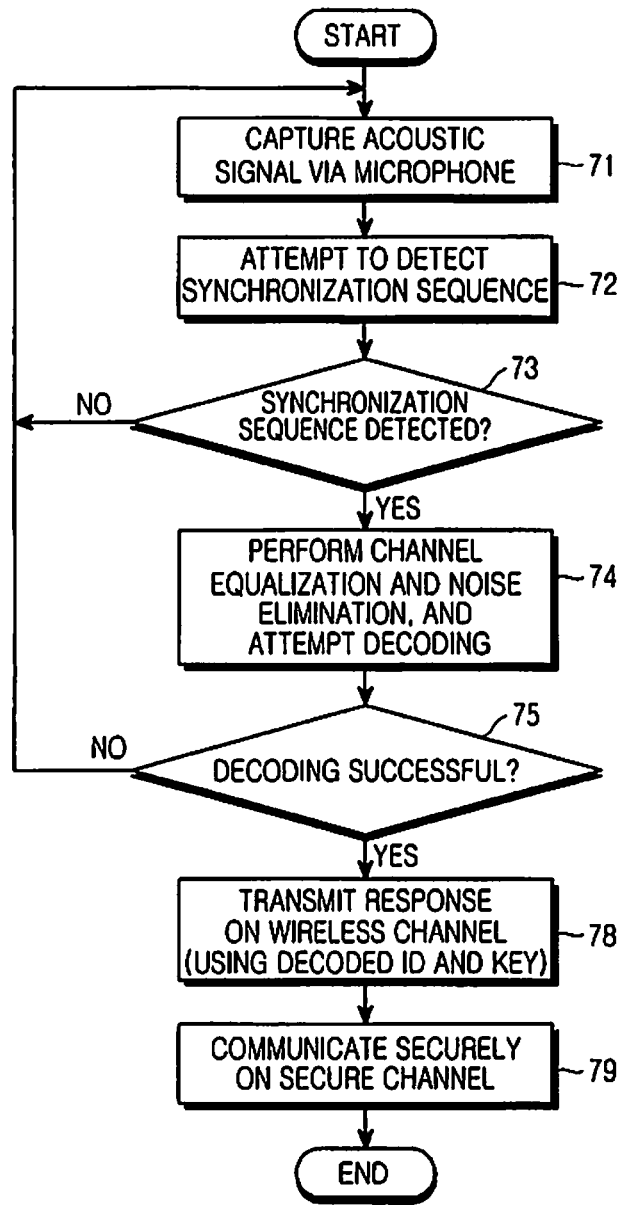
FIG. 7 is a flowchart illustrating an operation for establishing a wireless communication link using an acoustic signal in the base device according to an embodiment of the present invention.

FIG. 7 is a flowchart illustrating an operation for establishing a wireless communication link using an acoustic signal in the first device according to an embodiment of the present invention.

Referring to FIG. 7, the second device 2 transmits an acoustic signal to the first device 1 in the procedure illustrated in FIG. 5. The first device 1 acquires the acoustic signal through the microphone 17 in step 71. The ADC 16 digitizes the received audible tones, and the processor 13 and the controller 15 read out and digitally process the digital acoustic signal. Specifically, a synchronization sequence detection is attempted in step 72 and it is determined whether the synchronization sequence has been detected in step 73. If the synchronization sequence has not been detected in step 73, the first device 1 captures a new acoustic signal in step 71. Upon detection of the synchronization sequence, in step 74, the first device 1 processes the acoustic signal by channel-equalization, noise elimination, and decoding.

To determine whether the acoustic signal matches to an expected communication signal known to the controller 15, a pseudorandom key and identification information are extracted from the acoustic communication signal according to a known algorithm. If the decoding fails, the first device 1 captures a new acoustic signal in step 71. However, if the decoding is successful, the first device 1 generates and transmits a response signal (i.e., an acknowledgment) based on the received key and device identification information on a wireless channel in step 78. In step 79, a secure radio link is established and thus, the first device 1 communicates with the second device 2 on a secure channel in step 79.

The acknowledgment signal may correspond to a request signal for requesting wireless communication connection in the connection procedure between Bluetooth devices. Also, the acknowledgment signal may include identification information about the first device 1.

The secure link establishment procedure between the first device 1 and the second device 2 starts in compliance with the basic data type through the primary communication link. If the transceiver 12 was not previously placed in the reception/transmission mode, the processor 13 performs a mode transition according to a command received from the controller 15.

The secure link establishment procedure on the primary communication channel may be of any kind—both of a symmetrical type (based on a shared private key) and an asymmetrical type (based on a shared private key and a public key). The private key is known both to the basic and the second devices 1 and 2. The private key is shaped based on the pseudorandom key, which was generated by the second device 2 and transmitted to the first device 1 on the acoustic communication link.

In step 78, the processor 13 and the controller 15 of the first device 1 generate the acknowledgement signal (in response to reception of the acoustic signal from the second device 2), based on the private key and the transceiver 12 of the first device 1 is placed in the transmission mode. The acknowledgement signal is transmitted by a known method to the transceiver 12 and the aerial output of the first device 1. Operating in the reception mode, the transceiver 22 of the second device 2 receives the signal through the aerial input of the second device 2, processes it, and transmits it to the processor 23.

It is noted that the private key transmission through the primary communication link is not mandatory. For example, the controller 25 shapes the acknowledgement signal (i.e., the expected acknowledgement signal) based on the private key according to a known algorithm and compares it with a similar signal received through the primary communication channel. Methods for signal shaping and the contents of the acknowledgement signal may differ, like the acoustic signal.

A link establishment time may somewhat increase within a certain range, during gradual increase of the acoustic signal volume, but it will improve security of the link establishment, because the first device 1 is capable of decoding the audible tone with a minimum possible volume, which may considerably complicate interception and even detection of the audible tone by the malicious party.

In accordance with an embodiment of the present invention, in order to generate a long (and potentially endless) audible tone, two basic approaches may be used:

(a) cyclic repetition of one same communication signal; and (b) application of an error correction code with an infinite number of "parity" data during communication signal shaping, with repetitive interleaving with the foregoing synchronization sequence.

In this manner, higher-level interference immunity may be reached. However, these approaches may need more computational resources both in the first and the second devices 1 and 2. Digital processing of such audible tones usually requires some resources of the processor 13 in the basic device 1. It is related to the fact that for detection or decoding of the audible tone, the following is usually required:

- to calculate convolution of the input signal with the foregoing synchronization sequence;
- to carry out digital filtering for removal of noises and interference;
- to carry out equalization in a channel equalizer (to compensate for a multipath sound propagation effect); and
- to carry out forward error correction decoding of the signal, for the purpose of error detection and correction.

To satisfy all these requirements, a processor with a capacity of 50 to 150 MIPS is used in the first device 1. However, at present, this is not really a limitation because the majority of modern smart phones and communicators are designed on the basis of 200 to 1000 MIPS processors. Also. most modern models of inexpensive mobile telephones have a processor with a capacity more than 100 MIPS, thereby enabling use of the given pairing method even in such inexpensive telephone models.

A specific embodiment of a protected link algorithm may differ depending on the requirements of crypto resistance of the system. However, the link will be established based on application of one same communication signal (a private key formed in the second device 2) transmitted in the shape of the audible tone. In the simplest case, a communication signal with a constant power is transmitted within a definite period of time (e.g., 5 sec.), which is sufficient for its detection by the microphone 17 of the first device 1.

The methods for establishing a wireless communication link and the wireless communication system according to the embodiments of the present invention shorten the time of the protected link establishment because a device detection procedure and PIN code entry are not necessary. Further, the above-described embodiments actually reduce the possibility of incorrect PIN code entry (communication signal) to zero due to the exclusion of human factors, and increase the security level of the link, because the audible tone may contain a long key. Additionally, the embodiments of the present invention do not increase product cost actually because they use existing hardware and require only a modification to the already built-in software.

While the embodiments of the present invention have been described above with reference to a base device and an second device, the terms "first" and "second" are used for the convenience. Accordingly, the embodiments of the present invention are applicable to any devices that perform similar functions as the above-referenced first and second devices.

Also, although the embodiments of the present invention have been described in the context of Bluetooth communication, the embodiments of the present invention are applicable to other radio or wireless communication schemes.

While the present invention has been shown and described with reference to certain embodiments of the present invention thereof, it will be understood by those skilled in the art that various changes in form and details may be made therein without departing from the spirit and scope of the present invention as defined by the appended claims and their equivalents.

What is claimed is:

1. A method for wireless communication using an acoustic signal between a first device and a second device, comprising:
   i) generating, by the second device, when the second device connects to the first device, connection initiation information including key information for secure communication;
   ii) converting the connection initiation information to an acoustic signal;
   iii) transmitting the acoustic signal to the first device through an acoustic communication channel;
   iv) monitoring a radio wireless channel, which is secured using the key information for secure communication, to determine whether a valid response from the first device is received;
   v) upon lack of receipt of the valid response from the first device, increasing a volume level of the acoustic signal by a predetermined amount, up to a maximum volume level, and repeating steps i) through vi); and
   vi) upon receipt of the valid response from the first device, discontinuing transmission of the acoustic signal, and communicating with the first device securely on the radio wireless channel.

2. The method of claim 1, wherein the connection initiation information further includes identification information about the second device, and the valid response includes the key information, identification information about the first device, and the identification information about the second device.

3. The method of claim 1, wherein the connection initiation information includes identification information about the second device.

4. The method of claim 1, wherein the connection initiation information includes a pseudorandom key.

5. The method of claim 1, wherein the valid response from the first device must be received within a predetermined period of time.

* * * * *